United States Patent
Harris

(10) Patent No.: US 9,878,673 B2
(45) Date of Patent: Jan. 30, 2018

(54) VEHICLE SEAT CARGO RESTRAINT

(71) Applicant: WB Designs, LLC, Mendham, NJ (US)

(72) Inventor: Sally Harris, Mendham, NJ (US)

(*) Notice: Subject to any disclaimer, the term of this patent is extended or adjusted under 35 U.S.C. 154(b) by 0 days.

(21) Appl. No.: 15/000,688

(22) Filed: Jan. 19, 2016

(65) Prior Publication Data

US 2016/0243993 A1  Aug. 25, 2016

Related U.S. Application Data

(60) Provisional application No. 62/120,669, filed on Feb. 25, 2015.

(51) Int. Cl.
  *B60R 7/04* (2006.01)
  *B60R 22/00* (2006.01)

(52) U.S. Cl.
  CPC ........ *B60R 7/043* (2013.01); *B60R 2022/005* (2013.01)

(58) Field of Classification Search
  CPC ............. B60R 7/043; B60R 2011/0012; B60R 2011/0031; B60R 2022/005
  See application file for complete search history.

(56) References Cited

U.S. PATENT DOCUMENTS

| | | | |
|---|---|---|---|
| 6,533,350 B1 | 3/2003 | Rotstein | |
| 6,742,837 B1 | 6/2004 | Alexander | |
| 6,923,356 B2 | 8/2005 | Reynolds | |
| 7,309,102 B1 | 12/2007 | Davis | |
| 7,614,689 B2 | 11/2009 | Fowler et al. | |
| 8,690,034 B2* | 4/2014 | Peterson | B60R 11/00 224/563 |
| 2005/0023312 A1 | 2/2005 | Steinberg | |
| 2005/0230443 A1 | 10/2005 | Bredeson | |
| 2006/0084556 A1* | 4/2006 | Payne | A63B 21/0552 482/121 |
| 2011/0101054 A1 | 5/2011 | Wicinski | |
| 2011/0248057 A1 | 10/2011 | Schmitz | |
| 2013/0082491 A1 | 4/2013 | Rapkin | |

* cited by examiner

*Primary Examiner* — Corey Skurdal
(74) *Attorney, Agent, or Firm* — Baldini Law, LLC; Jack B. Baldini, Esq.

(57) ABSTRACT

The embodiments disclosed herein relate generally to an unobtrusive and easily deployed cargo restraint device capable of restraining items placed onto a vehicle seat. More particularly, the present invention relates to a cargo restraint device that is configured to keep said cargo from slipping or falling off a vehicle's seat while maintaining accessibility to said cargo, and allowing for the full use of the vehicle seat for passengers without the need to remove the cargo restraint device.

16 Claims, 4 Drawing Sheets

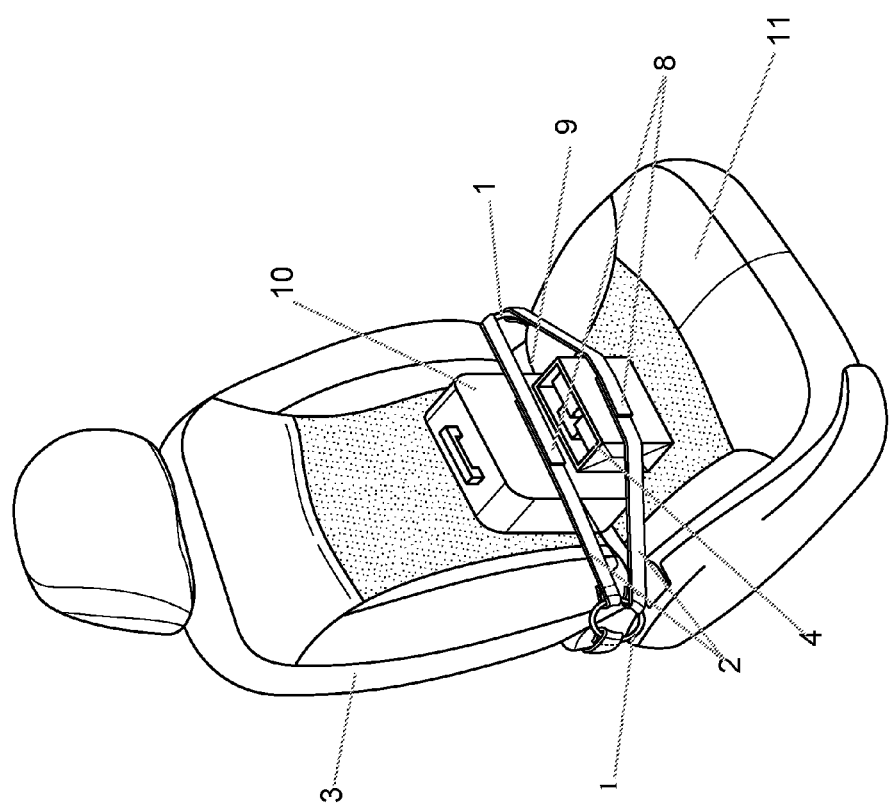

VEHICLE SEAT CARGO RESTRAINT

FIELD OF THE INVENTION

This application claims priority to Provisional U.S. Patent Application Ser. No. 62/120,669, filed on Feb. 25, 2015.

BACKGROUND

The embodiments disclosed herein relate generally to an unobtrusive and easily deployed cargo restraint device capable of restraining items placed onto a vehicle seat. More particularly, the present invention relates to a cargo restraint device that is configured to keep said cargo from slipping or falling off a vehicle's seat while maintaining accessibility to said cargo, and allowing for the full use of the vehicle seat for passengers without the need to remove the cargo restraint device.

An empty seat in a vehicle is often used as a place to temporality place or store cargo. Typically, the operator of a vehicle simply places cargo, such as groceries, a briefcase, a purse, electronic device, or other object or objects on the seat of the vehicle and drives away. Often, when the vehicle undergoes a turn or sudden stop, cargo placed or stored on a seat will shift, fall over or fall off said seat due to the laws of momentum, gravity and/or centrifugal force, thereby possibly damaging the cargo and/or the vehicle and distracting the vehicle's driver. To prevent the shifting or falling of items placed or stored on a vehicle seat, the driver of a moving vehicle often reaches over, instinctively, while operating the vehicle to catch or manually restrain the shifting cargo, thereby distracting the driver and increasing the risk of unsafe vehicle operation.

It is an object of embodiments disclosed herein to provide a simple, unobtrusive, cost-efficient and effective cargo restraint device for a vehicle seat that is simple to install and does not have to be removed from a vehicle seat when said seat is occupied by a vehicle passenger.

Cargo restraint devices for vehicle seats are known. Existing cargo restraints however, have numerous disadvantages when compared to the disclosed embodiments. Existing cargo restraint devices for vehicles seats are cumbersome, large, and have to be removed from the seat in order for a passenger to occupy said seat. Moreover, other currently known cargo restraints cover the cargo in such a manner that said cargo cannot be accessed while it is secured or restrained by said device. Other currently known devices have to be permanently installed or mounted to the seat or seat frame and/or are otherwise time consuming to implement or install.

For example, U.S. Pat. No. 6,742,837 titled CARGO SEAT NETTING SYSTEMS discloses a "car seat system including a car seat assembly having a horizontal seat portion with a front edge and a rear edge and a vertical back portion with a top edge and a bottom edge. A sheet assembly includes a front sheet portion positionable above the front edge of the seat portion and side sheet portions positionable above the side edges of the seat portion. A tube assembly includes at least one vertical tube with the sheeting assembly coupled thereto. The tube is positionable adjacent to the seat portion. A securement assembly couples the sheeting assembly and tube in position with respect to the seat portion."

In another example, U.S. Pat. No. 6,533,350 titled PARCEL RESTRAINT FOR AUTOMOBILE SEAT discloses a "device for restraining parcels and other objects that are typically transported in an automobile on a passenger seat. Prior art devices for holding objects from sliding off of automobile seats suffer from several disadvantages, including that they need to be removed from the seat before the seat can be occupied by a passenger. In the present invention, a neoprene (or like elastic material) belt is designed to encircle the upright portion of an automobile seat and provide a bottomless pocket with the seat back into which parcels, such as handbags, books, water bottles and the like, can be conveniently stowed and which are restrained from falling off of the seat when the automobile is brought to a halt. The pocket-forming component of the belt covers the passenger seat back support and is free from any seams or protrusions that would cause discomfort to a passenger."

In another example, U.S. Pat. No. 6,923,356 titled METHOD AND APPARATUS FOR RETAINING BAGS discloses an "an apparatus and method are provided for retaining bags. The apparatus for retaining bags utilizes at least one fastener attached to a shock absorption system. The shock absorption system is coupled to a handle and a strap, such that the apparatus for retaining bags can be transported by either of the handle or strap and the strap is adaptable to fit around an automobile seat. The method for retaining bags includes securing bags to a fastener, adjusting the strap to fit a shoulder, transporting the apparatus to a vehicle, and adapting the strap to fit to the automobile seat."

In another example, U.S. Pat. No. 7,309,102 titled SEAT NET discloses a "seat net prevents items placed on a bucket-style seat of an automobile from falling onto the floor, while still allowing the automobile driver convenient access to any items so placed while driving. The seat net helps drivers maintain safe driving practices by eliminating the need for drivers to lean into the passenger side of the vehicle, thereby diverting their attention from the road, to reach for fallen items. The seat net has a mesh material combined with a series of straps which allow for easy loading and retrieval of items and rapid attachment of the seat net device to bucket-style passenger seats of various sizes."

In another example, U.S. Pat. No. 7,614,689 titled SEAT INTEGRATED TETHER SYSTEM discloses a "seat integrated tether system for use in a vehicle for the secure placement of an article on a vehicle seat. One or more retractable or extendable tethers are adapted for attachment to the side of the vehicle seat. By use of the system with the front passenger seat of a vehicle the driver may have ready access to the contents of the retained article, which may be an item storage article such as an open top bag, case or storage net."

In another example, U.S. Patent Application Publication No. US 2005/0023312 A1 titled CARGO RESTRAINT AND STORAGE DEVICE AND METHOD discloses "a cargo restraint and storage device is provided for restraining and storing cargo items placed onto a front passenger seat of a vehicle, thereby restraining the cargo items from flying out of the passenger seat or shifting dangerously when a vehicle is in motion, particularly in a sudden stop or a sharp turn. In one embodiment, a cargo restraint and storage device includes a piece of flexible material having an opening for receiving at least a portion of a seat back section of a front passenger seat. The piece of flexible material has a plurality of pockets with different shapes and sizes for storing varying shapes and sizes of cargo items, thereby restraining the cargo items from flying out of the front passenger seat when a vehicle is in motion, and being accessible to a driver of the vehicle."

In another example, U.S. Patent Application Publication No. US 2005/0230443 A1 titled BACKPACK FOR TRACTOR SEAT—CARGO CARRYING discloses a device "comprised of a pliable material main body having attached cargo pockets of pliable material and cargo tie straps. The cargo tie straps are a combination of pliable material and hook and loop fasteners. The main body incorporates two sets of adjustable fastening straps that allow it to be cinched to the back of a seat. The first of two cinch straps is made of pliable material, a buckle loop and hook and loop fasteners. The second of two cinch straps is made of elastic strips and hook and loop fasteners."

In another example, U.S. Patent Application Publication No. US 2011/0248057 A1 titled TOTE TETHER discloses an "elongated strap with a first and second connecting snap to support one or a plurality of hanging items. Each end of the strap is folded on itself and snapped in position along the interior of the strap, forming two closed loops. The first loop may be secured by hand or to an external support, such as a vehicle seat headrest, a shopping cart or similar structure. The second loop passes through the handles of reusable grocery bags, hand bags or totes to securely hold and organize the items. The strap itself is a high strength material that can support the load of the suspended items and is adorned with a decorative pattern or color on its outer surface. In use, the device is intended to organize empty grocery totes along the outer rim of a grocery cart while shopping, as well as organize and store empty totes on the backside of a vehicle seat."

In another example, U.S. Patent Application Publication No. US 2011/0101054 A1 titled CARGO SLING SYSTEMS discloses a "cargo sling device comprising: a removably attachable strap made from pliable material suitable to fit around a perimeter of a vehicle seat back; the removably attachable strap is used to safely restrain at least one item of interior cargo such as Kleenex®, baby supplies, lunch boxes, groceries, purses and other such items. In certain embodiments the removably attachable strap comprises a one-piece construction and in alternate embodiments comprises a bifurcated construction wherein the removably attachable strap comprises a first end and a second end. The removably attachable strap preferably comprises an elastic material suitable to stretch around the seat back and the secured items. The multi piece construction embodiment of the removably attachable strap preferably comprises at least one fastener such as a zipper, snap, clip, button or other fastener(s). The fastener(s) may be located in the front and/or the back when installed. The zipper or other fastener may be used to couple the first end and the second end of the removably attachable strap together."

Lastly, in another example, U.S. Patent Application Publication No. US 2013/0082491 A1 titled VEHICLE SEAT ACCESSORY discloses a "vehicle seat accessories configured to secure cargo are presented including: a rectangular planar panel having a stretch property, the rectangular planar panel sized to removably wrap around a vehicle seat back, where the rectangular panel includes an upper lengthwise edge, a lower lengthwise edge, a proximal crosswise edge, and a distal crosswise edge; an upper rolled hem disposed along the upper longitudinal edge, the upper rolled hem having a stretch property; a lower rolled hem disposed along the lower longitudinal edge, the lower rolled hem having a stretch property; a first fastener element disposed along the proximal crosswise edge; and a second fastener element disposed along the distal crosswise edge, where the second fastener element is adjustably and removably mated with the first fastener element when the vehicle seat accessory is wrapped around the vehicle seat back."

The foregoing examples demonstrate that currently known vehicle seat cargo restraint devices lack the simplicity, effectiveness and unobtrusiveness of embodiments as disclosed herein.

Therefore, there remains an unmet need for a simple to install and simple to use device that provides a user the ability to secure and/or restrain cargo on a vehicle seat to keep said cargo from slipping or falling, while said cargo remains accessible, and without the need to remove the device when the seat is used for passengers or otherwise when the device itself is not in use.

SUMMARY OF THE INVENTION

Embodiments disclosed herein provide for an unobtrusive cargo restraint device capable of securing cargo to a vehicle's seat such that during transport or vehicle operation the cargo will remain secure, and therefore, will not shift or fall, while maintaining complete accessibility to said cargo. When the device is affixed to a vehicle seat, but not in use, the device is unobtrusive and/or easily concealable and therefore, will not inhibit or prevent a passenger from using the seat upon which the device remains installed.

BRIEF DESCRIPTION OF THE DRAWINGS

FIG. 4 is a front view of one embodiment of the device disclosed herein when installed on a vehicle seat showing two different sizes of cargo (4 and 10) secured by the stretchable bands (2), each stretchable band (2) comprising an adjustment mechanism (8) and each stretchable band (2) affixed to two identical attachment rings (1).

DETAILED DESCRIPTION

Figure 1:
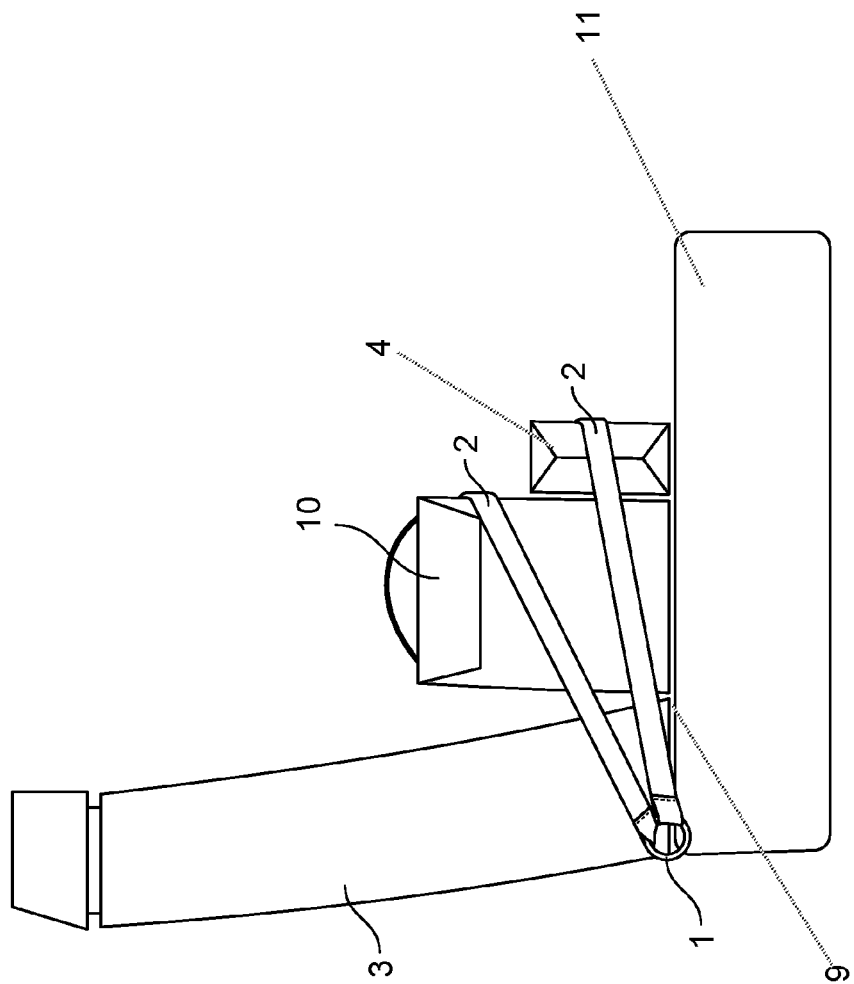
FIG. 1 is a side view of one embodiment of the device disclosed herein when installed on a vehicle seat wherein one stretchable band fits behind the vehicle seat backrest (3) and a plurality of other stretchable bands (2) wrap around and secure the cargo (4 and 10) placed on the passenger area of same seat, all stretchable bands (2) affixed to two identical attachment rings (1) which rest on either side of the vehicle seat.
Figure 2:
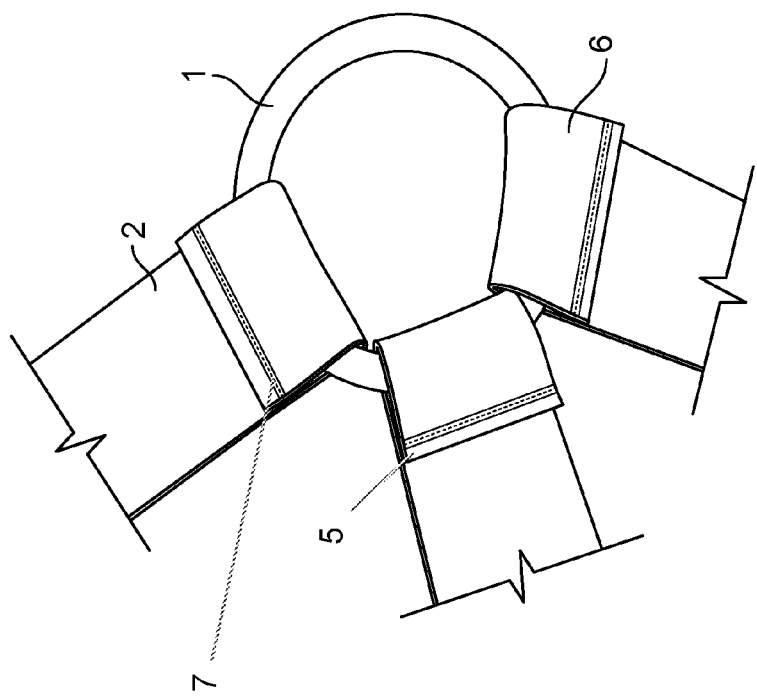
FIG. 2 is a zoomed view of one embodiment of an attachment ring (1) showing how the stretchable bands (2) in certain embodiments of the devise disclosed herein are permanently affixed to each attachment ring (1) by looping the terminus of said stretchable band (5) around said attachment ring (1), thereby creating a loop (6) around the attachment ring (1), and affixing the terminus of the band to the band itself (2) via a means to secure said band terminus to itself such as stitching (7).
Figure 3:
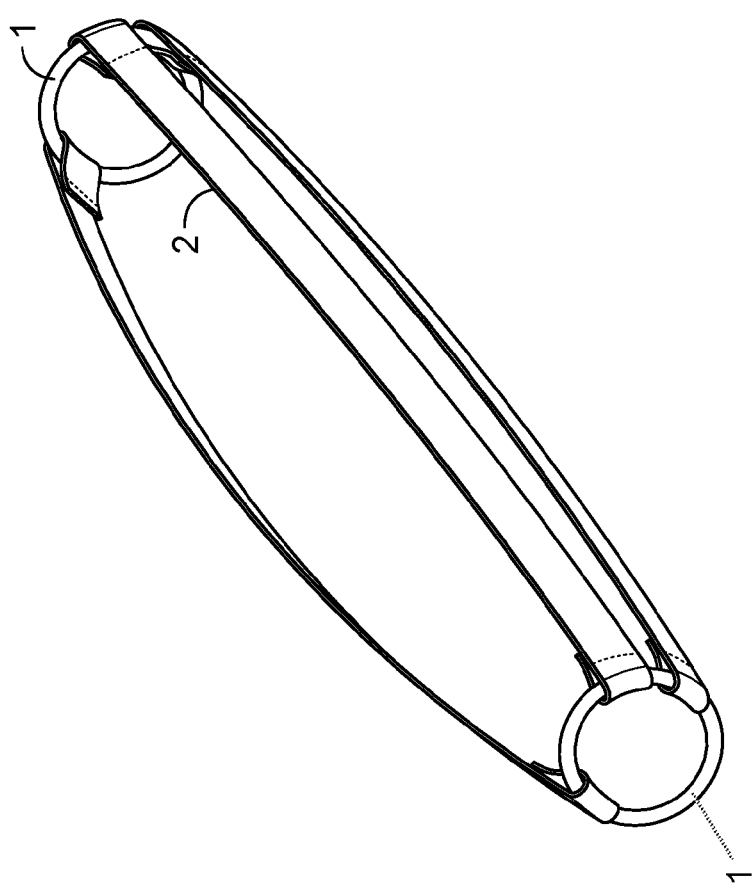
FIG. 3 is a perspective view of one embodiment of the device disclosed herein with a configuration of three identical stretchable bands (2), each identical stretchable band attached at one end to one attachment ring (1) and attached at the other end to another attachment ring (1).

For clarity of disclosure, and not by way of limitation, the following detailed description is divided into the following subsections that describe or illustrate certain features, embodiments, applications and examples of implementation of the present invention.

The Device of the Present Invention

One embodiment provides for a cargo restraining device, specially adapted for use on a vehicle passenger seat comprising:

i. two attachment rings (1);
ii. a plurality of stretchable bands (2);
iii. wherein each stretchable band is secured at one end to one attachment ring (1) and at its other end to the other attachment ring (1).

In one embodiment, there are a plurality of stretchable bands (2) made from any suitable stretchable material that exhibits elasticity properties or elastic modulus to exert a suitable force, when wrapped around a vehicle seat backrest (3) and cargo (4 and 10) simultaneously, to restrain said cargo against forward and sideways thrust generated from momentum, gravitational and centrifugal forces and thus, prevent said cargo from shifting or falling from the vehicle seat.

In one embodiment, one stretchable band (2) is specifically configured to fit around and secure to a vehicle seat's backrest (3), while a plurality of other stretchable bands (2) are specifically configured to secure and restrain cargo (4 and 10).

In one embodiment, the disclosed device is specifically configured to be used on a front passenger vehicle seat with the length of the stretchable bands (2) chosen in consideration of the width of the vehicle seat and the size of typical cargo to be restrained. Various similar embodiments may configure the length of the stretchable bands (2) to accommodate wider or narrower seats and larger or smaller cargo. In alternative embodiments, the stretchable bands (2) may be all of the same size or of varying sizes. In one embodiment, the stretchable band (2) sizes are chosen such that one stretchable band fits behind the vehicle seat back (3) and a plurality of additional stretchable bands go in front of the vehicle seat backrest (3) with the attachment rings (1) positioned at the bottom of the vehicle seat backrest (3) where the vehicle seat backrest (3) meets the vehicle seat platform (11) such that when the plurality of stretchable bands are deployed to restrain cargo, a suitable force is exerted to restrain the cargo without causes damage to said cargo.

In one embodiment, the disclosed device is specifically configured to be used on any passenger vehicle seat.

In one embodiment, the disclosed device is specifically configured to be used on rear vehicle seats.

In one embodiment, the disclosed device is specifically configured to be used on a any vehicle seat.

In one embodiment, the disclosed device is specially configured to be used in a vehicle's trunk. The commonality in this and the prior embodiments is that one of the stretchable bands must be capable of securing around a stable object within the vehicle while the other stretchable bands are capable of securing vehicle cargo to the stable object, wherein all of the stretchable bands are secured together via attachment rings (1) that are positioned at or near the securing stable object. Examples of a stable object are the vehicle passenger seat back (3) and the rear vehicle seat back.

In one embodiment, the attachment rings (1) are rigid and non-malleable. Suitable materials for the fabrication of rigid non-malleable attachment rings (1) include any hard, durable, strong, and crack resistant material such as a metal, alloy, synthetic resin or hard plastic.

In one embodiment, the attachment rings (1) are soft and malleable. Suitable materials for the fabrication of soft and malleable attachment rings (1) include any durable natural or synthetic fiber or fabric such as nylon, hemp, cotton, or canvas.

In one embodiment, each individual stretchable band (2) is a different length to facilitate the securing of varying sizes, shapes and weights of cargo to a vehicle seat.

In one embodiment, one or more of the of stretchable bands (2) are of different lengths such that the device can secure to a vehicle seat a wide range of cargo sizes, shapes and weights.

In one embodiment, one or more of the stretchable bands (2) are of such a length that it will fit around, and secure the device to a wide variety of vehicle seat backrests.

In one embodiment, one or more of the stretchable bands (2) includes an adjustment mechanism (8) such that the stretchable band's length is adjustable. The adjustment mechanism may be comprised of any hook and loop material such as VELCRO®. It will be obvious to those skilled in the art that the adjustment mechanism is not limited to hook and loop material and may incorporate the use of any device known in the art for attaching two ends of material together.

In one embodiment, all the stretchable bands (2) include an adjustment mechanism (8). In another embodiment, the adjustment mechanism (8) joins two end of a split stretchable band. In an alternative embodiment, the adjustment mechanism (8) operates without the need to split the stretchable band but merely cinches together a portion of the stretchable band's length.

In one embodiment, each individual stretchable band (2) has a different elasticity property or elastic modulus from the other stretchable bands.

In one embodiment, one or more of the stretchable bands (2) has unique elasticity properties or elastic modulus from the other stretchable bands.

In one embodiment, one or more of the stretchable bands (2) is further comprised of a non-slip component permanently affixed to the inner, outer or both surfaces of the stretchable band. The non-slip component may be comprised of any non-slip or grip enhancing substance such as rubber, synthetic rubber, silicone, silicone rubber or abrasive substance. It will be obvious to those skilled in the art that the non-slip component is not limited to the foregoing substances and may be comprised of any suitable material that possesses a tacky or abrasive property. In one embodiment, the non-slip component may be magnetic or a hook and loop fastener such as VELCRO®.

In a preferred embodiment, the device is comprised of three identical stretchable bands (2) of equal elasticity properties or elastic modulus, each identical stretchable band measuring about 1 inch wide by 20 inches long in un-stretched length, each end of the three identical stretchable straps permanently affixed to two identical rigid non-malleable attachment rings (1) via looping the stretchable band terminus (5) around the attachment ring (1) and stitching (7) the terminus (5) to the stretchable band (2) to form a loop (6), each attachment ring having a diameter of about 1.5 inches.

In one embodiment, the manner of fastening at least one of the stretchable bands (2) to the attachment rings (1) is such that the stretchable band can be easily detached and reattached from the attachment rings (1) via an attachment mechanism. The attachment mechanism may be comprised of any hook and loop material such as VELCRO® or snaps. It will be obvious to those skilled in the art that the attachment mechanism is not limited to hook and loop material or snaps and may incorporate the use of any device known in the art for attaching two ends of material together.

In one embodiment, one or both terminus (5) of at least one of the stretchable bands (2) is further comprised of an attachment mechanism such that the stretchable band can be easily detached and reattached from the attachment rings (1).

In one embodiment, the stretchable bands (2) and/or the attachment rings (1) are manufactured from a material that matches or complements the color of the interior of the vehicle in which it will be used.

In one embodiment, the stretchable bands (2) have a removable decorative covering that can be easily removed and replaced, said decorative covering coming in various colors such that the outward color of the stretchable bands (2) may become any desired color by simply replacing the decorative covering.

Examples

For clarity of disclosure, the following example is based on one specific use of the device disclosed herein in connection with a grocery bag (4) as an example of cargo. One of ordinary skill in the art will appreciate the many applications and embodiments of the device of the present invention.

A vehicle operator has gone shopping and has a bag of groceries (4). There are children taking up the entire back seat. The trunk is full of other items. Typically, in this situation, the person will put the bag of groceries (4) on the front seat. Left to its own devices and unrestrained, the bag of groceries (4) can easily tip over or fall off the front seat due to normal vehicle movements. This can make vehicle operator distracted or prompt them to use their hand to stop the bag from falling, thereby creating a dangerous circumstance.

In this situation, a vehicle operator with the device of the present invention, can quickly and easily secure the bag of groceries (4) to the front vehicle seat and thus prevent it from tipping or falling off the seat while the vehicle is in motion. Typically, a user of the device of the present invention will already have installed the device on the subject seat prior to use. The device is installed by placing one of the stretchable bands (2) around the backrest (3) of the desired vehicle seat with the attachment rings (1) at either side of the bottom of the seat's backrest (3), and the plurality of stretchable bands (2) located around the front of the same seat. When not in use, the front stretchable bands (2) tuck into the seat fold (9) for unobtrusive storage. When use is desired, the user can pull one or more of the stretchable bands (2) from storage in the seat fold (9).

Now that the vehicle operator has a bag of groceries to secure to the vehicle seat upon which the device is installed, he or she simply reaches into the seat fold (9) and retrieves one or more of the stretchable bands (2) and stretches the band(s) around the front of the bag of groceries (4) thereby securing it to the vehicle seat. Due to the unobtrusive and minimal size of the stretchable band(s) (2), the contents of the bag of groceries (4) remain fully accessible to the operator of the vehicle and the bands can be used over and over again.

At the same time, the user can also secure other cargo (10) in addition to the bag of groceries (4) on the same seat through the use of one or more of the other unused stretchable bands (2). The additional cargo (10) can be of a completely different size than the grocery bag (4), for example a purse or briefcase (10). When home, the user can easily slip the bag of groceries (4) and other secured cargo (10) out from beneath the stretchable band(s) (2) and return the stretchable band(s) (2) to the seat fold (9) for unobtrusive storage, thereby making the seat fully available for passengers without the need to uninstall the device.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A cargo restraint device adapted for use with a vehicle seat comprising:
   i. two attachment rings, each attachment ring comprised of a closed circular loop; and
   ii. a plurality of stretchable bands;
      wherein every single individual stretchable band is non-removably affixed at one terminus to one attachment ring and at the other terminus to the other attachment ring, wherein the plurality of stretchable bands are configured such that each attachment terminus location of each stretchable band on one attachment ring is substantially the same as its counterpart attachment terminus location on the other attachment ring without any crossing over of any stretchable band over any other such that each stretchable band is configured to operate completely independently of any other stretchable band except through a force exerted through the attachment ring.

2. The device of claim 1 wherein the plurality of stretchable bands are of equal un-stretched length.

3. The device of claim 1 wherein the plurality of stretchable bands are of unequal un-stretched lengths.

4. The device of claim 1 wherein the attachment rings are non-malleable.

5. The device of claim 1 wherein the attachment rings are malleable.

6. The device of claim 1 wherein one or more of the stretchable bands further comprise an adjustment mechanism.

7. The device of claim 1 wherein one or more of the stretchable bands is further comprised of a non-slip component.

8. The device of claim 1 wherein all of the stretchable bands exhibit the same elasticity properties.

9. The device of claim 1 wherein one or more of the stretchable bands exhibits different elasticity properties.

10. The cargo restraint device of claim 1, wherein the plurality of stretchable bands adjustably extend within an area defined by a back rest and seat rest of a cargo seat to which the device is to be attached.

11. A cargo restraint device adapted for use with a vehicle seat comprising:
    i. two attachment rings, each attachment ring comprised of a closed circular loop; and
    ii. three identical stretchable bands;
       wherein every single identical stretchable band is non-removably affixed at one terminus to one attachment ring and at the other terminus to the other attachment ring wherein the three identical stretchable bands are configured such that each attachment terminus location of each stretchable band on one attachment ring is substantially the same as its counterpart attachment terminus location on the other attachment ring without any crossing over of any stretchable band over any other such that each stretchable band is configured to operate completely independently of any other stretchable band except through a force exerted through the attachment ring.

12. The device of claim 11 wherein the attachment rings are non-malleable and each of the three identical stretchable bands measure about 1 inch wide by about twenty inches long in un-stretched length and each non-malleable attachment ring has a diameter of about 1.5 inches.

13. The device of claim 11 wherein the attachment rings are malleable and each of the three identical stretchable bands measure about 1 inch wide by about 20 inches long in un-stretched length and each non-malleable attachment ring has a diameter of about 1.5 inches.

14. The device of claim 11 wherein one or more of the identical stretchable bands is further comprised of a non-slip component.

15. The device of claim 11 wherein one or more of the identical stretchable bands further comprise an attachment mechanism.

16. A cargo restraint device adapted for use with a vehicle seat comprising:
   i. a first band having a first end and a second end, the first band having a length complementary to the width of a cargo seat at a location of the meeting of the back rest and seat rest of a cargo seat to which the device is to be attached;
   ii. identical first and second attachment ring, the first attachment ring attached to the first end of the first band and the second attachment ring attached the second end of the first band, the attachment rings and the attachment terminus locations to the respective first and second ends of the first band configured to be substantially the same; and
   iii. a plurality of additional stretchable bands, each with a first end and a second end and each further attached at their respective first ends to the first attachment ring and their respective second ends at the second attachment ring, the attachment rings and the attachment terminus locations on the respective first ends, second ends and first and second attachment rings configured such that corresponding first and second ends are on substantially the same location on corresponding first and second attachment rings without any crossing over or necessary touching of any stretchable band to any other stretchable band, each configured to stretch and operate independently from any other except through a force exerted through an attachment ring.

* * * * *